May 6, 1969 N. O. ROSAEN 3,442,382
FLAT FILTER INDICATOR
Filed Oct. 8, 1965 Sheet 1 of 4

INVENTOR
NILS O. ROSAEN

BY *Hauke & Hauke*
ATTORNEYS

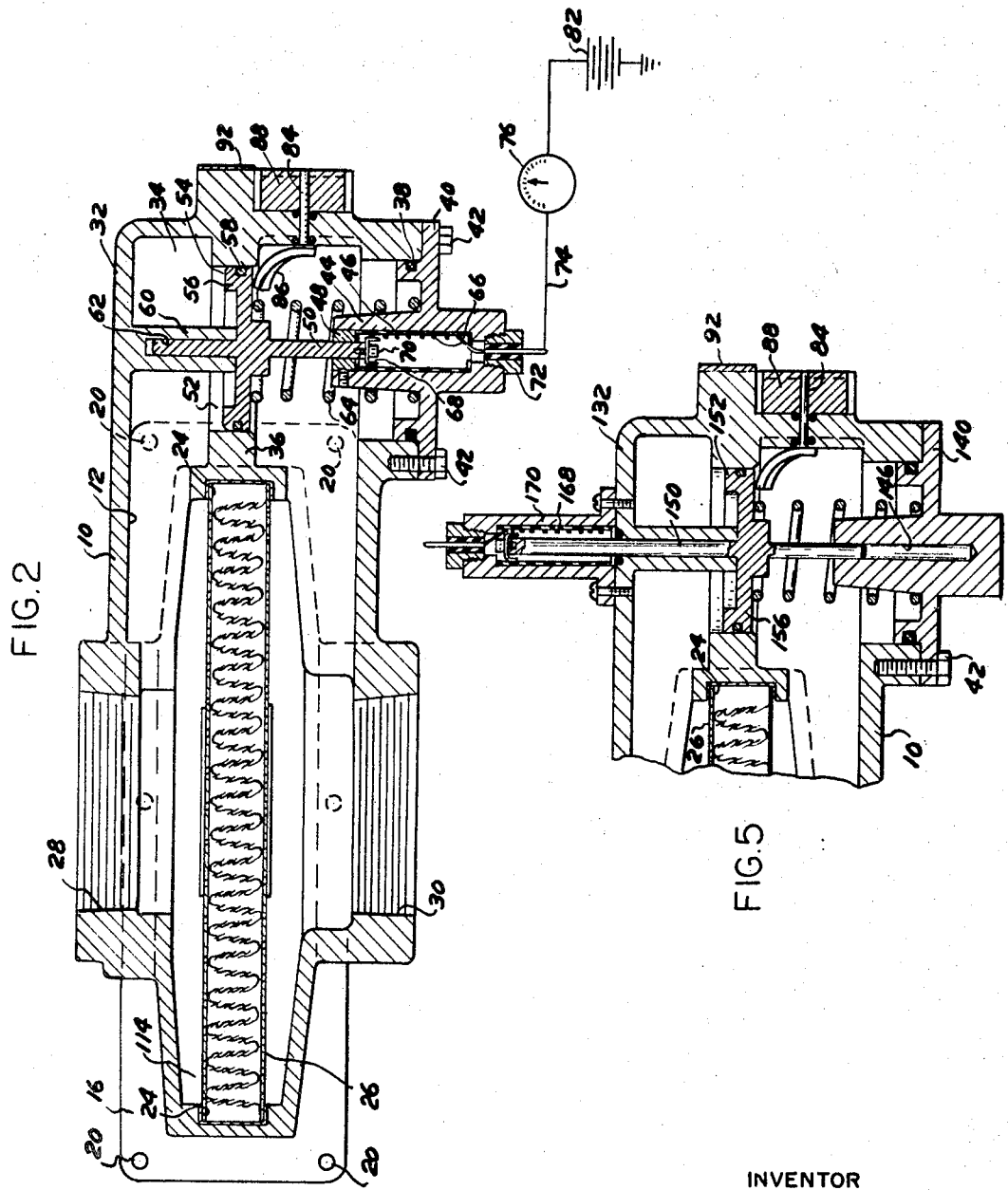

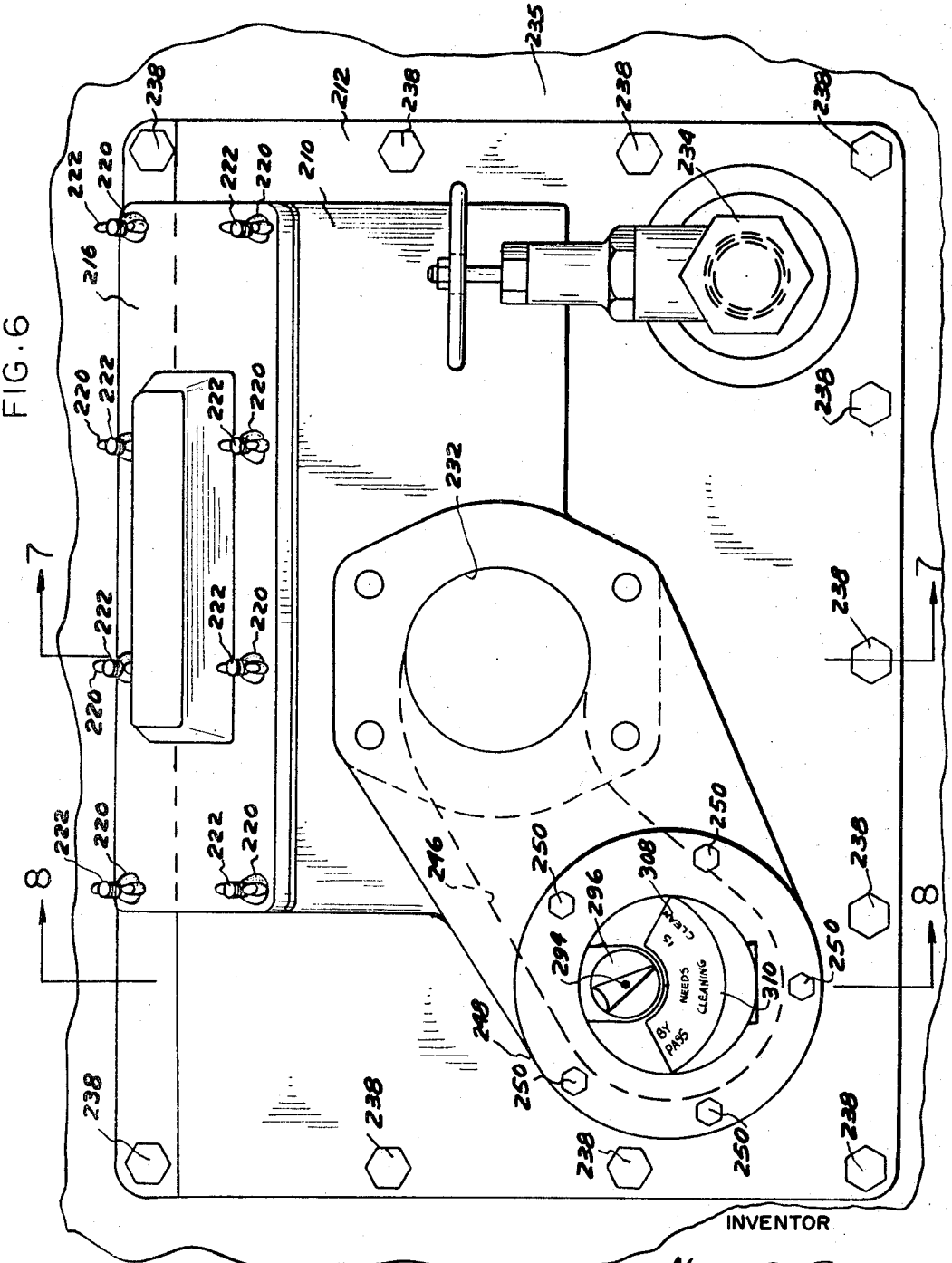

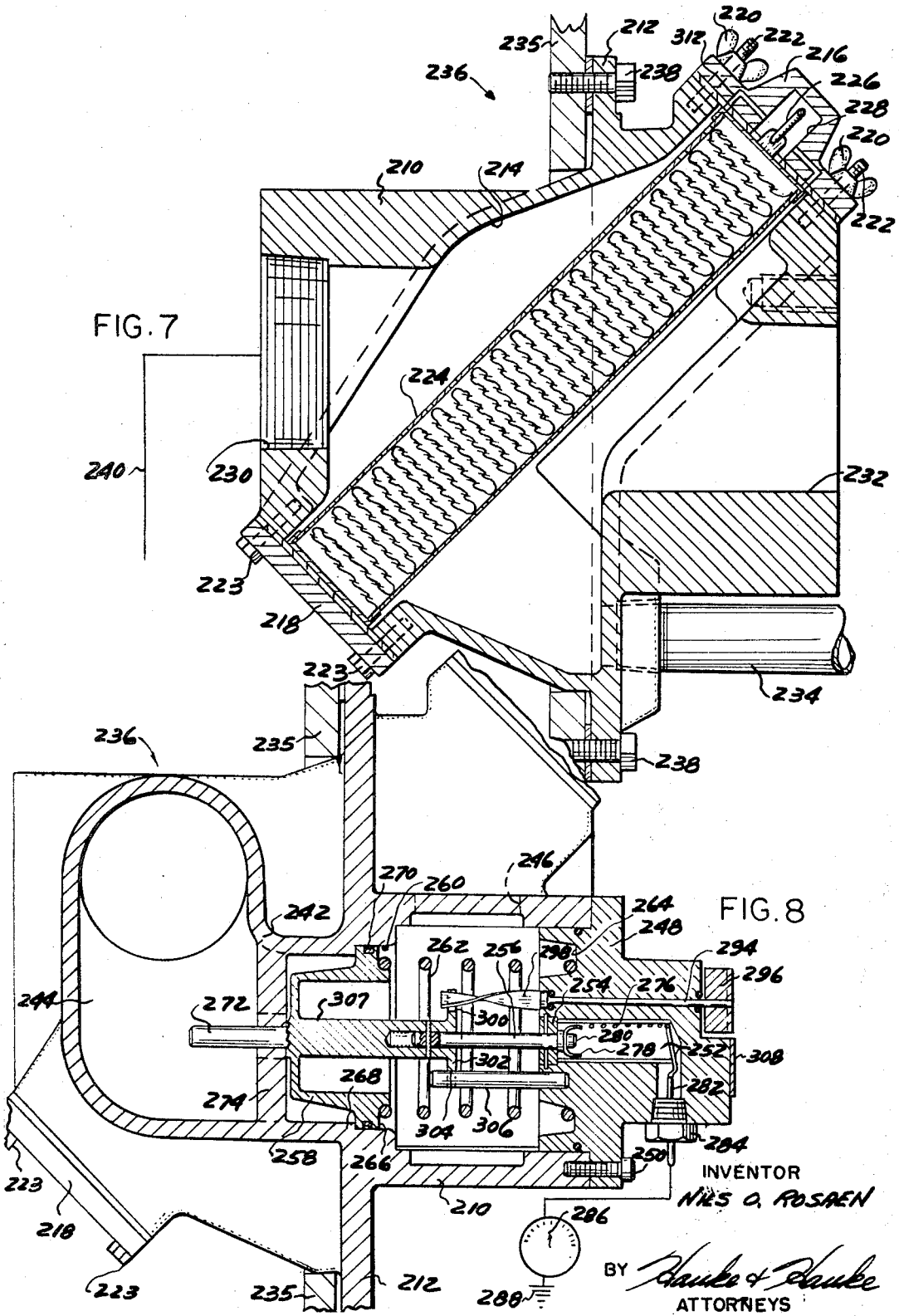

… ……… …… … … … …

United States Patent Office 3,442,382
Patented May 6, 1969

3,442,382
FLAT FILTER INDICATOR
Nils O. Rosaen, Bloomfield Hills, Mich., assignor, by mesne assignments, to Parker-Hannifin Corporation, Cleveland, Ohio, a corporation of Ohio
Filed Oct. 8, 1965, Ser. No. 494,214
Int. Cl. B01d 35/14
U.S. Cl. 210—90                                11 Claims

ABSTRACT OF THE DISCLOSURE

A filter device includes a flat rectangular filter element carried within a filter chamber, a second chamber is in registry with the filter chamber and a piston is carried within the second chamber with one side communicating with the inlet side of the filter element and an opposite side communicating with the outlet side of the filter element, an electrical circuit is connected to the piston to indicate changes in the pressure differential across the filter element to thereby indicate the degree of clogging of the filter element. In a second embodiment a second mechanical indicating means is provided.

---

The present invention relates to fluid filter devices and more particularly to an improved construction for such devices.

Heretofore filter devices for hydraulic systems and the like have utilized cylindrical filter elements. Filter elements shaped in the form of a hollow cylinder have the disadvantage that the interior passage through the element must be of sufficiently large diameter so as not to interfere with fluid flow through the element. Because of this filter devices have been heretofore rather bulky and attempts to reduce the size of filter devices have not been successful.

The present invention provides a filter device utilizing a new rectangular and flat filter element. The filter element is of a pleated construction so that the filtering area provided is comparable to that provided by a cylindrical element utilizing the same materials and because the interior passage has been eliminated, the element can be carried in a smaller more compact housing.

Further the filter device of the present invention is constructed to provide ready access to the filter element which can be easily removed for cleaning and or replacement. Means for indicating the condition of the filter element are provided and a bypass means is also provided which is automatically operable to open a path directly from the inlet to the outlet of the device when the filter element reaches a predetermined clogged condition.

It is an object then of the present invention to reduce the size of fluid filtering devices by providing such a device with a new flat, rectangular filter element.

It is another object of the present invention to improve such filter devices by providing means indicating the clogged condition of the element.

It is yet another object of the present invention to improve such filter devices by providing bypass means operable to open a path bypassing the filter element upon the element reaching a predetermined clogged condition.

Still further objects and advantages of the present invention will be readily apparent to one skilled in the art to which the invention pertains upon reference to the following description of several preferred embodiments of the invention. The description makes reference to the accompanying drawings in which like reference characters refer to like parts throughout the several views and in which:

FIG. 2 is a longitudinal cross sectional view taken substantially on line 2—2 of FIG. 1.

FIG. 5 is a fragmentary longitudinal cross sectional view illustrating a preferred modification of the structure shown in FIG. 2.

FIG. 6 is a side elevational view of another preferred embodiment of the present invention.

FIG. 7 is a longitudinal cross sectional view taken substantially at line 7—7 of FIG. 6, and FIG. 8 is a longitudinal cross sectional view taken substantially at line 8—8 of FIG. 6.

Figure 1:
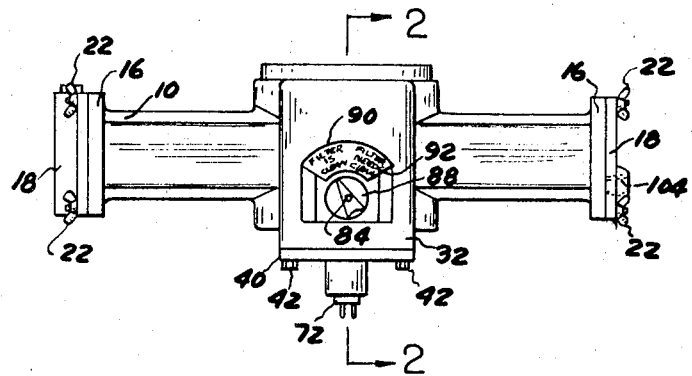
FIG. 1 is an elevational side view of one preferred filter device of the present invention.
Figure 3:
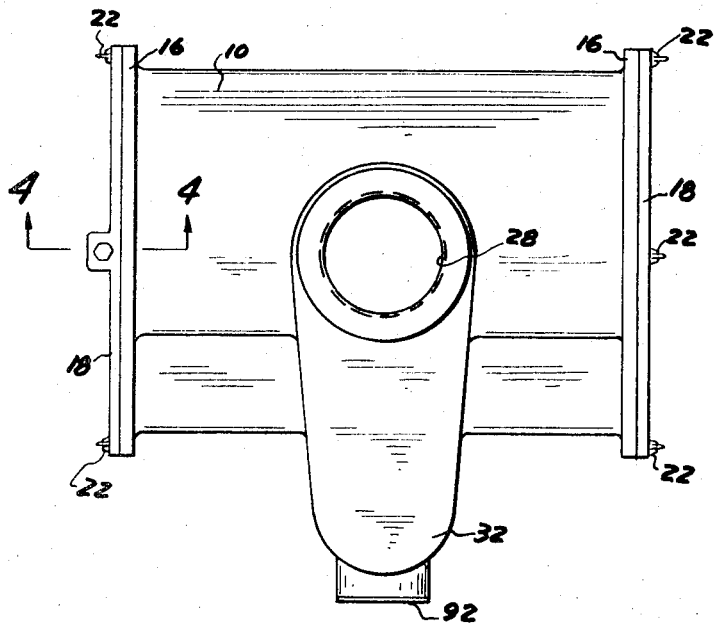
FIG. 3 is a top elevational view of the device shown in FIG. 1.

Now referring to the drawings for a more detailed description of the present invention, FIGS. 1–4 illustrate one preferred embodiment thereof as comprising a flat hollow housing member 10 defining a filter chamber 12. The housing 10 is provided with elongated oppositely disposed openings 14 outlined by mounting flanges 16. Plates 18 are positioned against the mounting flanges 16 to close the openings 14 and are secured in place by bolts 20 and wing nuts 22. Oppositely disposed elongated recesses 24 provided in the inner walls of the housing 10 provide the means for supporting a rectangular filter element 26 within the filter chamber 12. The housing 10 is provided with a centrally positioned inlet port 28 and an outlet port 30 both opening to the filter chamber 12 on opposite sides of the filter element 26.

A boss portion 32 is formed integral with the housing 10 and extends outwardly from one elongated edge thereof substantially midway between the sides of the housing 10 provided with the openings 14. The boss portion 32 forms a chamber 34 divided by a partition 36 with one side of the partition 36 connected with the inlet side of the filter element 26 and the opposite side of the partition 36 connected with the outlet side of the filter element 26 as can best be seen in FIG. 2. The boss portion 32 is provided with an opening 38 closed by a cap member 40. The cap member 40 is mounted in position by bolts 42 and is provided with an axially elongated portion 44 extending into the chamber 34 on the outlet side of the partition 36. The portion 44 is provided with an axial bore 46 and a fluid tight bushing 48 is carried in the inner end of the bore 46. The bushing 48 provides the means for axially slidably receiving an elongated rod 50 for axial movement within the bore 46. The partition 36 is provided with a circular opening 52 defined by a cylindrical wall 54 axially aligned with the bore 46. The rod 50 is preferably provided with a radially enlarged portion forming a piston 56 axially slidably received in the opening 52. The piston 56 carries a piston ring 58 adapted to engage the wall 54. An inwardly extending portion 60 of the boss portion 32 is provided with bore 62 for receiving the upper end of the rod 50 to aid in maintaining the piston 56 in alignment with the opening 52 during movement of the rod 50 and to limit axial movement of the piston 56 in one direction. A spring 64 biased between the cap member 40 and the piston 56 urges the piston 56 against the free end of the inwardly extending portion 60.

A variable resistor member 66 is carried within the bore 46 and a cup shaped electrical connector member 68 is mounted to the end of the rod 50 by an axially inserted screw 70 in a position to engage the resistor member 66. The resistor member 66 is electrically connected through an insulated plug 72 by an electrical lead 74 to a voltmeter 76 as shown diagrammatically in FIG. 2. The voltmeter 76 is electrically connected with an electrical power source 82.

The variable resistor 66 is of a conventional construction and is operable to vary the resistance through the electrical circuit in accordance with the particular point at which the connector 68 engages the resistor 66. Thus at each axial position of the piston 56 a different resistance will be produced through the circuit and the position 56 can be indicated remote from the device by the voltmeter 76.

The boss portion 32 rotatably carries a shaft 84 on an axis substantially normal to the axis of the piston 56. An arm member 86 is fixed to the inner end of the shaft 84 and extends substantially transversely therefrom. The arm member 86 engages the piston 56 so that axial movement of the piston 56 produces a corresponding rotational movement of the shaft 84. A pointer member 88 is fixed to the end of the shaft 84 exteriorly of the boss portion 32 and points to indicia 90 provided on an indicator plate 92 as can best be seen in FIG. 1.

Figure 4:
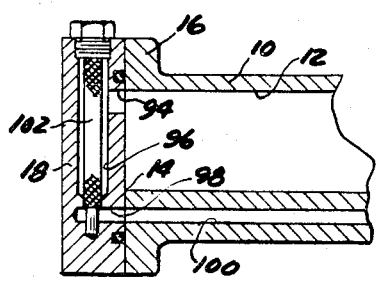
FIG. 4 is a fragmentary cross sectional view taken substantially on line 4—4 of FIG. 3 and with the filter element removed for purposes of clarity.

As can best be seen in FIG. 4, one of the plates 18 is provided with a passage 94 opening to the upper portion of the filter chamber 12 on the inlet side of the filter element 26, a passage 96 is registering with the passage 94 and a passage 98 providing communication between the passage 96 and a passage 100 provided in the housing 10. The passage 100 registers with the outlet port 30. The passage 96 carries a filter member 102. The housing 10 is provided with a drain connection 104 opening to the lower portion of the filter chamber 12 on the outlet side of the filter element 26 as can best be seen in FIG. 1.

In the filter device illustrated in FIGS. 1–4, the fluid to be filtered enters through the inlet port 28 and passes through the filter element 26 before being discharged from the device through the outlet port 30. The filter device 26 is flat as described above and is preferably provided with a plurality of elongated pleats. In this way, the capacity of the filter element 26 is the same as a similarly constructed cylindrical element but because it is flat, the interior outlet passage of the element has been eliminated and the dimensions of the filter device have been substantially reduced.

The passages 94, 96, 98 and 100 provide the means for permitting any air which may accumulate on the inlet side of the filter element 26 to be drawn off through the outlet port 30 during operation of the device. The filter member 102 prevents foreign matter from bypassing the filter element 26. The drain connection 104 permits the filter chamber 12 to be drained when it becomes necessary to change the filter element 26.

As the filter element 26 becomes clogged, a pressure differential will be produced across the element 26 which will increase with the degree of clogging. This increased pressure differential will cause the piston 56 to move axially within the opening 52 against the force of the spring 64. The axial position which the piston 56 will assume then will depend upon the degree of clogging of the filter element 56 and this will be indicated exteriorly of the filter housing 10 by the voltmeter 76 and by the pointer member 88. As explained above, the voltmeter 76 is operable to indicate the position of the piston 56 and thus the condition of the filter element 26 through the change in electrical resistance produced by the connector 68 and the variable resistor 66. Thus with proper indicia provided on the voltmeter 76 an indication of the filter condition can be provided at a point remote from the filter device.

The shaft 84, the arm member 86, and the pointer member 88 also are actuated in response to changes in the position of the piston 56 and also therefore are operable, in combination with the proper indicia 90, to indicate the condition of the filter element 26. This provides a means for checking the condition of the filter element 26 while near the device.

FIG. 5 illustrates a preferred modification of the device disclosed in FIGS. 1–4 in which the variable resistor 168 is carried in a cap member 170 mounted to the boss portion 132. A cap member 140 is provided with a bore 146 which receives the opposite end of the rod 150. The rod 150 carries a piston 156 within the opening 152 so that the device operates substantially as described above except that the resistor 168 is mounted within a removable housing 170 and can therefore be removed for replacement or repair without disturbing the other components of the device.

FIGS. 6–8 disclose another preferred embodiment of the present invention as comprising a housing member 210 having a medial peripheral flange 212 and defining a flat filter chamber 214 disposed such that the plane of the flange 212 intersects the chamber 214 angularly as can best be seen in FIG. 7. Cap members 216 and 218 close the upper and the lower end of the filter chamber 214 respectively and are maintained in position by wing nuts 220 received by threaded studs 222 carried by the housing member 210 and by bolts 223 respectively. A flat rectangular pleated filter element 224 similar to the filter element 26 described above, is carried within the filter chamber 214 and is provided with an handle portion 226 received in a suitable recess 228 provided in the cap member 216.

The housing member 210 is provided with an inlet port 230 opening to the filter chamber 214 on one side of the filter element 224 and an outlet port 232 opening to the filter chamber 214 on the opposite side of the filter element 224. A drain connection 234 is connected to the lower end of the filter chamber 214 on the outlet side of the filter element 224.

As can best be seen in FIG. 7, the filter device is adapted to be mounted adjacent the side wall 235 of a fluid reservoir 236 by screws 238 extending through the flange 212 with that portion of the housing member 210 on the inlet side of the flange 212 disposed within the reservoir 236 and the rest of the filter device on the outside of the reservoir. The inlet port 230 is adapted to receive an inlet pipe 240 shown diagrammatically in FIG. 7.

As can best be seen in FIG. 8, the housing member 210 is provided with a cored portion 242 which defines a chamber 244 connected to the filter chamber 214 on the inlet side of the filter element 224 and connected to the outlet side of the filter chamber 214 through a port 246. The chamber 244 is closed by a cap 248 mounted to the housing member 210 by screws 250 exteriorly of the reservoir 236.

The cap 248 is provided with an axial bore 252 and a bushing 254 carried in the inner end of the bore 252 provides the means for axially slidably receiving a rod 256. The inner end of the rod 256 is staked to a piston 258 axially slidably received on an annular inner wall portion 260. A spring 262 having one end seated in a recess 264 provided in the cap 248 and the opposite end seated in a recess 266 provided in the piston 258 urges the piston 258 against a seat 268 formed in the inner wall portion 260. The piston 258 carries a piston ring 270 which closes communication through the chamber 244 when the piston 258 is against the seat 268 and for a short axial movement of the piston 258 against the spring 262 and along the wall 260. An elongated extension 272 of the piston 258 is received by a ported partition 274 to provide a guide for axial movement of the piston 258 and to permit the piston 258 to move axially to a position in which the piston ring 270 is not in engagement with the wall 260.

The bore 252 provides the means for carrying a variable resistor member 276 and a cup shaped electrical connector 278 is mounted to the free end of the rod 256 by an axially inserted screw 280 to engage the variable resistor 276. The variable resistor 276 is electrically connected by a lead 282 through an insulated plug 284 to a voltmeter 286 as shown diagrammatically in FIG. 8. The voltmeter 286 is connected to an electrical power source 288.

The cap 248 rotatably carries a shaft 294. A pointer element 296 is fixed to the outer end of the shaft 294 and an actuator element 298 is fixed to the inner end thereof. The actuator element 298 comprises a flat strip of material having a uniform twist about its longitudinal axis throughout the length thereof and extends into a rectangular slot 300 provided in a radially extending portion 302 of the piston 258. The portion 302 is provided with hole 304 which receives one end of a guide pin 306 having its opposite end carried by the cap 248. The piston 258 is provided with an annular recess 307 which accommodates the pin 306 and the actuator element 298 when the piston 258 is moved to its extreme axial position against the force of the spring 262. As can best be seen in FIG. 6, the cap 248 carries on its exterior surface an indicator plate 308 bearing indicia 310 associated with the pointer element 296.

As can best be seen in FIG. 7, the cap member 216 is provided with a passage 312 connecting the upper portion of the filter chamber 214 on the inlet side of the filter element 224 with the filter chamber 214 on the outlet side of the element.

The device illustrated in FIGS. 6–8 operates substantially as described above with respect to the device of FIGS. 1–5 except that it is intended to be mounted against the reservoir 236. By positioning the filter chamber 214 and the filter element 224 angularly with respect to mounting flange 212, the filter element 224 can be readily removed for cleaning or replacement upon removal of the cap member 216.

The piston 258 like the piston 56 described above, is responsive to pressure increase across the filter element 224 to actuate filter condition indicating means. The remote indicating means comprising the variable resistor member 276, the connector 278 and the voltmeter 286 operates substatially as described above and is operable to indicate the condition of the filter element 224 through changes in the position of the piston 258 and therefore changes in the point of contact between the connector 278 and the variable resistor 276.

The means for indicating the condition of the filter element 224 near the filter device comprises the actuator element 298, the shaft 294, the pointer element 296, and the indicia 310 provided on the indicatorr plate 308. Axial movement of the piston 258 produces corresponding rotation of the actuator element 298 through the engagement between the piston 258 and the actuaor element 298 afforded by the recangular slot 300 so that each change in the position of the piston member 258 produces a corresponding change in the position of the pointer element 296. Thus with proper indicia 310 the condition of the filter element 224 can be indicated exteriorly of the device.

In the embodiment illustrated in FIGS. 6–8, the filter element 224 can be readily removed from the housing 210 for cleaning or replacement without it being necessary to remove the device from the reservoir 236. The cap member 216 can be removed and the handle portion 226 grasped to slide the filter element 224 from the device. Again, because the filter element 224 is of a pleated construction and because it is flat it can be mounted within a housing which has a smaller filter chamber than those required by cylindrical filter elements of equal capacity. The device therefore can be much more compact. Further, due to the particular construction of the embodiment disclosed in FIGS. 6–8, where a large portion of the device is disposed within the fluid reservoir, the device takes even less space.

It is apparent that although I have described but two embodiments of my invention many other changes and modifications can be made therein without departing from the spirit of the invention as expressed by the appended claims.

I claim:
1. A filter device comprising
  (a) a housing member defining a flat filter chamber,
  (b) a flat filter element carried within said filter chamber,
  (c) said housing member having an inlet and an outlet opening to said filter chamber on opposite sides of said filter element,
  (d) a second chamber defined by said housing member and having one side registering with said filter chamber on the inlet side of said filter element and an opposite side registering with said filter chamber on the outlet side of said filter element,
  (e) pressure responsive means carried in said second chamber intermediate said inlet and said outlet sides of said filter element, and
  (f) means actuated by said pressure responsive means for indicating changes in the pressure differential across said filter element to thereby indicate the degree of clogging of said filter element, said means comprising an electrical circuit including a variable resistor and a voltmeter, and means actuating said variable resistor to vary the resistance through said electrical circuit in accordance with changes in the pressure differential across said filter element as sensed by said pressure responsive means.

2. The filter device as defined in claim 1 and in which said pressure responsive means is operable to open a bypass path through said second chamber upon the pressure differential across said filter element reaching a predetermined value.

3. The filter device as defined in claim 1 and in which said pressure responsive means comprises a piston movable axially in response to changes in the pressure differential across said filter element.

4. The filter device as defined in claim 3 and including a second indicating means comprising
  (a) a shaft rotatably mounted in said housing on an axis substantially normal to the axis of movement of said piston,
  (b) a pointer element fixed to said shaft for rotation therewith exteriorly of said housing,
  (c) indicia associated with said pointer element, and
  (d) an arm carried on the end of said shaft opposite said pointer element and having its free end engaging said piston.

5. The device as defined in claim 3 and including a second indicating means comprising
  (a) a shaft rotatably mounted in said housing on an axis substantially parallel to the axial movement of said piston,
  (b) a pointer element fixed to said shaft for rotation therewith exteriorly of said housing,
  (c) indicia associated with said pointer element,
  (d) an actuator element carried on the end of said shaft and extending coaxially therewith at the end opposite said pointer element,
  (e) said actuator element comprising a flat strip having end to end,
  (f) said piston being provided with a radially extending portion provided with a rectangular slot receiving said actuator element whereby axial movement of said actuator element.

6. The device as defined in claim 1 and including
  (a) a fluid reservoir having a side wall, and
  (b) said housing being mounted to extend through said side wall into said reservoir with said inlet disposed within said reservoir and said outlet disposed exteriorly thereof.

7. The device as defined in claim 6 and in which
  (a) said filter element is carried within said housing to extend angularly with respect to said side wall with a lower portion disposed within said reservoir and an upper portion disposed exteriorly thereof, and
  (b) a cap member removably carried by said housing to provide access to the upper portion of said filter element.

8. A filter device comprising
  (a) a housing member defining a flat filter chamber,
  (b) a flat rectangular pleated filter element carried within said filter chamber, (c) said housing member having an inlet and an outlet opening to said filter chamber on opposite sides of said filter element, (d) a second chamber having one side thereof connected to the inlet side of said filter element and an opposite side connected to the outlet side of said filter element, (e) a piston carried in said second chamber and means urging said piston toward a position closing fluid flow through said second chamber, (f) said piston being axially movable in said second chamber in accordance with changes in the pressure differential across said filter element, (g) a first indicating means comprising an electrical circuit including a voltmeter and a variable resistor and means connected with said piston and movable therewith to vary the resistance produced by said variable resistor within said electrical circuit to thereby indicate the position of said piston at a point remote from said housing, and (h) a second indicating means for indicating the position of said position adjacent said housing comprising a shaft rotatably mounted in said housing on an axis substantially normal to the axis of movement of said piston, a pointer element fixed to said shaft for rotation therewith exteriorly of said housing, indicia associated with said pointer element, and an arm carried on the end of said shaft opposite said pointer element and having its free end engaging said piston.

9. The device as defined in claim 8 and including
(a) a fluid reservior having a sidewall, and
(b) said housing being mounted to extend through said sidewall into said reservoir with said inlet disposed within said reservoir and said outlet disposed exteriorly thereof.

10. The device as defined in claim 9 and in which
(a) said filter element is carried within said housing in a position in which a lower portion is disposed interiorly of said sidewall and an upper portion is disposed exteriorly of said sidewall, and
(b) a cap member rerovably carried by said housing to provide access to the upper portion of said filter element.

11. The device as defined in claim 8 and in which said housing is provided with passages connecting the inlet side of said filter element with the outlet side thereof.

References Cited

UNITED STATES PATENTS

| | | | |
|---|---|---|---|
| 549,390 | 11/1895 | Patterson et al. | 210—447 X |
| 2,697,522 | 12/1954 | Lawrence | 210—447 X |
| 2,939,582 | 6/1960 | Giles | 210—130 X |
| 3,080,058 | 3/1963 | Rosaen | 210—90 |
| 3,323,648 | 6/1967 | Rosaen | 210—90 |
| 3,358,843 | 12/1967 | Bourdale | 210—493 |

FOREIGN PATENTS 240,347  11/1960  Australia.

SAMIH N. ZAHARNA, *Primary Examiner.*

U.S. Cl. X.R.

210—130, 172